Sept. 18, 1956

E. B. GRAVES ET AL 2,763,791

CONTROL FOR X-RAY APPARATUS

Filed May 22, 1953

INVENTOR.
Edward B. Graves
BY Morley G. Melden
Bates, Teare & McKee
Attorneys

United States Patent Office 2,763,791
Patented Sept. 18, 1956

2,763,791

CONTROL FOR X-RAY APPARATUS

Edward B. Graves, South Euclid, Ohio, and Morley G. Melden, New York, N. Y., assignors to Picker X-Ray Corporation, Waite Mfg. Div. Inc., Cleveland, Ohio, a corporation of Ohio Application May 22, 1953, Serial No. 356,700

6 Claims. (Cl. 250—95)

This invention relates to control equipment and more particularly to an apparatus for selectively conditioning a control for operation of X-ray apparatus.

Control equipment generally includes operating members for initiating or adjusting control elements in accordance with the basic factors sought to be controlled in operating any given type of apparatus. In X-ray apparatus, it is usual to provide independent control of the operating voltage, current and time of the X-ray tube so that in radiography, the tube may be operated under several selected conditions of operation, while fluoroscopy contemplates a single condition of operation which may be adjusted over a limited range. Thus, the control panel for such an apparatus includes operating members in the form of a selector device or switch and a facility for permitting limited adjustment of one of the selected conditions of operation. Since the adjusting facility is only required for operation during one of the selected conditions of operation, it is desirable to provide for some segregation of the operating members in order to simplify the procedural operating technique and thereby facilitate efficient operation with a minimum possibility of error. Optimum segregation contemplates a reduction in the number of operating members to the minimum of only those which are required for a given operating condition.

Accordingly, it is an object of this invention to accomplish the desired segregation by isolating an operating member when not in use and automatically rendering such operating member accessible in response to the attainment of a predetermined condition of operation during which it is adapted to function.

Another object of this invention is the provision of a simplified arrangement for presenting an operating control member for operation only when its control function is required.

Briefly, in accordance with this invention, there is provided an operating control member for selecting different conditions of operation for an X-ray apparatus control system in cooperation with another normally isolated operating control member for adjusting the operation of a predetermined selected condition over a limited range, each of which coact through a device responsive to the selection of such predetermined condition to render the isolated adjusting operating member accessible for operation.

Figure 1:
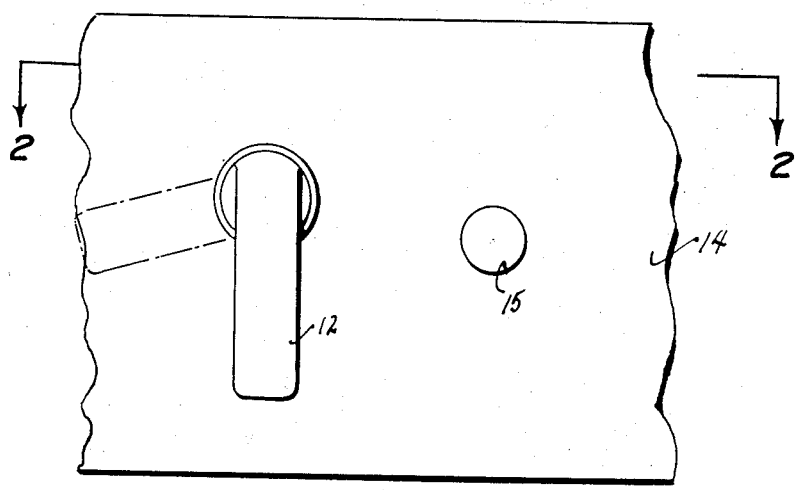
Fig. 1 illustrates a portion of a control panel with operating members thereon.
Figure 4:
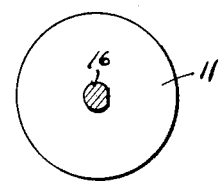
Fig. 4 is a view taken along the lines 4—4 in Fig. 2.
Figure 2:
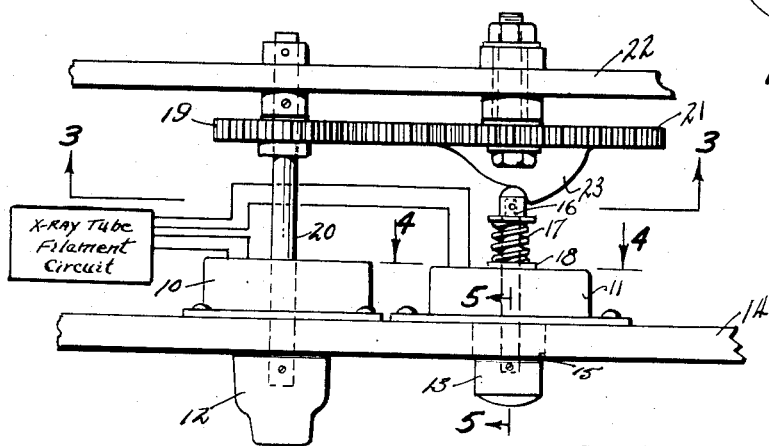
Fig. 2 is a view taken along the lines 2—2 in Fig. 1 to show the construction at the rear of the control panel.
Figure 3:
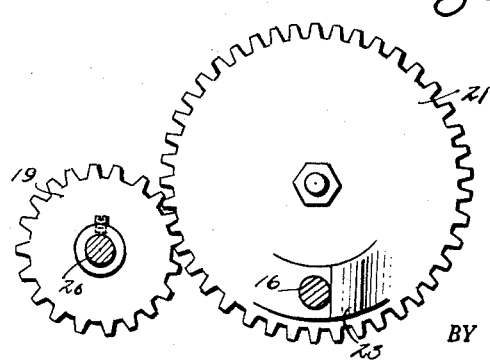
Fig. 3 is a view taken along the lines 3—3 in Fig. 2 to illustrate the operating control mechanism.

The operating control members of Figs. 1 and 2 of the drawings are shown in the environment of a control system for an X-ray apparatus which contemplates independent control of the X-ray tube operating voltage and current and to which the control conditioning apparatus described herein is particularly suited. In this type of apparatus, the X-ray tube operation may be varied by selecting desired conditions of operation for the transformer filament circuit of the tube which is diagrammatically shown in block form. When used for radiology, a plurality of different tube currents or conditions of operation are employed. These different conditions of operation are determined by a selector switch 10 which introduces different values of resistance in the transformer filament circuit of the tube. Utilization of the apparatus for fluoroscopic examinations, on the other hand, contemplates one major condition of operation with adjustment of the tube current over a limited range of such condition of operation. The adjustment may be accomplished by means of an adjustable rheostat or inductive regulator 11 diagrammatically shown connected in the transformer filament circuit. The operating lever 12 of the selector switch 10 as well as the fluoroscopic adjustment operating member 13 should be accessible on the apparatus control panel 14 when needed by an operator.

Figure 5:
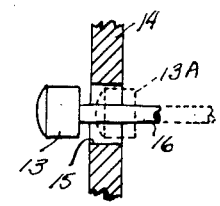
Fig. 5 is a sectional view taken along the lines 5—5 in Fig. 2.

Thus, the selector switch 10 may be positioned for different conditions of radiographic and fluoroscopic operation by means of the hand lever 12, while the adjustment of the transformer filament circuit during fluoroscopic operation may be accomplished by positioning the knob 13. Inasmuch as the adjustment knob 13 is used during only one setting of the selector switch 10 corresponding to utilization of the X-ray apparatus for fluoroscopic examinations, it is desirable to have the knob 13 isolated and not physically accessible to the operator except when required. This is accomplished in the drawings by providing the control panel 14 of the apparatus with an opening or recess 15 through which the knob 13 may pass when not in use. As best shown in Figs. 2 and 5, the knob 13 is carried on a shaft 16 which is biased by a spring 17 acting against the casing 18 of the adjustment control in a direction to normally urge the knob 13 into the panel recess.

Accessibility of the knob 13 is accomplished and correlated with the positioning of the selector switch 10 by mounting a gear 19 on the shaft 20 of the hand lever 12 which meshes with another gear 21 that is rotatably mounted on a support 22 at the rear of the shaft 16. The gear 21 carries a raised cam surface 23 on its face which when properly positioned engages the axial extremity of the shaft 16 at the rear of the panel and urges it axially in a direction to position the knob 13 outward from the panel recess for access to the operator. Rotation of the hand lever 12 to different selected positions for varying conditions of operation will in turn rotate the meshed gears 19 and 21 and, when the lever 12 is positioned to select the predetermined condition corresponding to fluoroscopic examination, the cam surface 23 is positioned to render the knob 13 accessible to the operator. In any other position of the hand lever 12, the cam is out of engagement with the shaft 16 and the knob 13 therefore is isolated from the operator within the panel recess.

Although the foregoing description was directed to operating control members in the environment of an X-ray apparatus, it is readily apparent that the control features and their correlated coaction can be adapted for use in any type of control system regardless of the type of energy or force controlled. The operating hand lever 12 and the adjustment knob 13 could, for example, control ports and orifices in a hydraulic or pneumatic control system as readily as they are adapted to control electrical energy in the X-ray apparatus shown and described herein. In any control environment, the correlated coaction between the operating members simplifies the control procedure for an operator by making available only those operating members actually in use and by automatically providing for the accessibility of additional operating control members when changes in operation require utilization of their control function.

We have shown and described what we consider to be the preferred embodiments of our invention, along with suggestions of modified forms, and it will be obvious to those skilled in the art that other changes and modifications may be made without departing from the scope of this invention as defined by the appended claims.

We claim:

1. In an X-ray tube filament circuit, a control device comprising in combination, a support, selector switch means carried by the support for coaction in the circuit to select different conditions of tube operation, variable impedance means carried by the support for coaction in the circuit to adjust a predetermined condition of operation over a limited range, a normally inaccessible device for positioning the variable impedance means, and other means coacting between the selector switch means and the variable impedance means in response to the selection of such predetermined condition of operation to render the positioning device accessible.

2. In combination with a control panel having a recess in one face, a selector device including a shaft rotatably extending through the control panel, means accessible on the panel for rotating the shaft to select different operating conditions, a control device adapted to adjust a predetermined selected operating condition over a limited range and including a shaft rotatably extending through the recess on the panel, means normally urging said adjusting shaft through the recess to render it inaccessible at said one face of the panel, and means coacting between the selector device and the adjusting device in response to the selection of the predetermined operating condition to render the adjusting shaft accessible at said one face of the panel.

3. In combination with a control panel having an opening therethrough, a selector device including a shaft rotatably extending through the panel and adapted to be positioned to select different operating conditions, means accessible at one side of the panel for rotating the shaft, a control device adapted to adjust a predetermined selected operating condition over a limited range including a shaft rotatably extending through the opening in the panel, spring-pressed means urging said adjusting shaft through the opening to render the shaft inaccessible from said one side of the panel, a pair of gears each carried on a different shaft and drivingly meshing, one of said gears having a raised cam surface on the face adjacent said adjusting shaft and adapted to be positioned by rotation of the selector shaft through the meshed gears to engage the adjusting shaft and urge it against the spring pressed means to render it accessible on said one side of the panel.

4. In an X-ray apparatus having a control panel provided with a recess in one face thereof, a selector switch having a shaft rotatably extending through the panel, a switch lever accessible at said one face of the panel for rotating the shaft to select different operating conditions, a regulator for adjusting a predetermined selected operating condition over a limited range and including a shaft rotatably extending through the recess on the panel, spring-pressed means coacting between the panel and the regulator shaft to withdraw the regulator shaft into the recess and thereby render it inaccessible from said one face of the panel, cam means operatively disposed adjacent the regulator shaft for selective engagement therewith to urge said shaft outward from the recess against the spring-pressed means and thereby render it accessible from said one face of the panel, and means driven by the selector shaft to position said cam means for engagement with the regulator shaft consequent upon the selector switch attaining a predetermined selected operating condition.

5. In an X-ray apparatus having an X-ray tube with a filament, a filament circuit including selective means for varying the filament operation, a control panel therefor, a selector switch accessible on the panel and coupled to the selective means to condition such means for different conditions of operation, an adjustable device normally inaccessible on the panel and coupled to one of said selective means for adjustment of the corresponding operating condition, and means coacting between the selector switch and the adjustable device in response to the selection of said one selective means to render the adjustable device accessible on the panel.

6. The apparatus of claim 5, wherein said last-mentioned means includes a cam surface adapted to be positioned by the selector switch to engage and urge the normally inaccessible device into accessible position on the panel.

References Cited in the file of this patent

UNITED STATES PATENTS

| | | |
|---|---|---|
| 677,027 | Garrett | June 25, 1901 |
| 2,477,298 | Goldfield | July 26, 1949 |